(12) United States Patent
Kahrizi et al.

(10) Patent No.: US 8,855,029 B2
(45) Date of Patent: *Oct. 7, 2014

(54) LMS ADAPTIVE FILTER FOR DIGITAL CANCELLATION OF SECOND ORDER INTER-MODULATION DUE TO TRANSMITTER LEAKAGE

(75) Inventors: Masoud Kahrizi, Irvine, CA (US); Jaleh Komaili, Irvine, CA (US); John E. Vasa, Irvine, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 583 days.

This patent is subject to a terminal disclaimer.

(21) Appl. No.: 12/947,905

(22) Filed: Nov. 17, 2010

(65) Prior Publication Data

US 2011/0116403 A1 May 19, 2011

Related U.S. Application Data

(63) Continuation-in-part of application No. 12/052,991, filed on Mar. 21, 2008, now Pat. No. 8,050,201.

(60) Provisional application No. 60/896,019, filed on Mar. 21, 2007.

(51) Int. Cl.

| H04B 1/44 | (2006.01) |
|---|---|
| H04B 1/30 | (2006.01) |
| H04B 1/04 | (2006.01) |
| H04B 1/52 | (2006.01) |
| H04B 7/212 | (2006.01) |
| H04B 1/38 | (2006.01) |
| H04L 5/16 | (2006.01) |
| H03D 1/04 | (2006.01) |
| H04L 25/03 | (2006.01) |

(52) U.S. Cl.
CPC ........ *H04B 1/0475* (2013.01); *H04L 25/03878* (2013.01); *H04B 1/30* (2013.01); *H04B 1/525* (2013.01)
USPC ............ 370/282; 370/324; 375/219; 375/346

(58) Field of Classification Search
CPC ........ H04B 1/525; H04B 1/0475; H04B 1/30; H04B 25/03878
USPC .................. 370/252, 310–350; 375/219, 346
See application file for complete search history.

(56) References Cited

U.S. PATENT DOCUMENTS

5,691,978 A 11/1997 Kenworthy
6,480,532 B1 11/2002 Vareljian
(Continued)

FOREIGN PATENT DOCUMENTS

JP 2003179521 A 6/2003
KR 10-2005-0066495 A 6/2005

OTHER PUBLICATIONS

Search Report for Application No. EP 08 74 4184, dated Jun. 18, 2012.
(Continued)

*Primary Examiner* — Xavier Szewai Wong
(74) *Attorney, Agent, or Firm* — Knobbe, Martens, Olson & Bear, LLP

(57) ABSTRACT

A transmit signal second-order inter-modulation (IM2) canceller for a portable handset using a full duplex mode of operation (e.g., WCDMA) is used to controllably reduce IM2 introduced by a transmit signal that appears in a received signal in a receive channel of the portable handset. The transmit signal IM2 canceller includes a delay estimator and a digital signal adjuster. The delay estimator receives a first input from a receive channel and a second input from a transmit channel. The delay estimator generates an estimate of the IM2 that the transmit channel introduces in the receive channel. The digital signal adjuster removes the estimate of the IM2 before forwarding a modified receive channel signal to a baseband subsystem of the portable handset.

20 Claims, 7 Drawing Sheets

(56) References Cited

U.S. PATENT DOCUMENTS

| | | |
|---|---|---|
| 2002/0072344 A1 | 6/2002 | Souissi |
| 2004/0014449 A1 | 1/2004 | Adachi et al. |
| 2004/0048576 A1 | 3/2004 | Hildebrand et al. |
| 2004/0203458 A1 | 10/2004 | Nigra |
| 2005/0020297 A1 | 1/2005 | Axness et al. |
| 2005/0159128 A1 | 7/2005 | Collins et al. |
| 2006/0229032 A1 | 10/2006 | Ninomiya et al. |
| 2007/0184782 A1 | 8/2007 | Sahota et al. |
| 2007/0217488 A1 | 9/2007 | Smaini et al. |
| 2007/0293255 A1 | 12/2007 | Bohnhoff |
| 2008/0144709 A1 | 6/2008 | McCallister et al. |
| 2008/0159415 A1 | 7/2008 | Miller et al. |
| 2009/0086863 A1* | 4/2009 | Komninakis et al. ......... 375/346 |

OTHER PUBLICATIONS

Sekul, Maria L.; Non-Final Office Action in U.S. Appl. No. 12/052,991, mailed Nov. 23, 2009, pp. 1-16.

Sekul, Maria L.; Final Office Action in U.S. Appl. No. 12/052,991, mailed May 11, 2010, pp. 1-17.

Sekul, Maria L.; Advisory Action in U.S. Appl. No. 12/052,991, mailed Sep. 14, 2010, pp. 1-3.

* cited by examiner

LMS ADAPTIVE FILTER FOR DIGITAL CANCELLATION OF SECOND ORDER INTER-MODULATION DUE TO TRANSMITTER LEAKAGE

CROSS REFERENCE TO RELATED APPLICATIONS

This application is a continuation-in-part of co-pending and commonly assigned U.S. patent application Ser. No. 12/052,991, filed on Mar. 21, 2008, entitled "LMS Adaptive Filter for Digital Cancellation of Second Order Inter-Modulation Due to Transmitter Leakage," which is hereby incorporated into this document by reference in its entirety, and which claims priority to U.S. Provisional Patent Application titled, "LMS Adaptive Filter for Digital Cancellation of IM2 Due to Transmitter Leakage," having application Ser. No. 60/896,019, filed on Mar. 21, 2007, which is also hereby incorporated into this document by reference in its entirety.

BACKGROUND

This invention relates generally to transceiver architecture in a wireless portable communication device.

With the increasing availability of efficient, low cost electronic modules, mobile communication systems are becoming more and more widespread. For example, there are many variations of communication schemes in which various frequencies, transmission schemes, modulation techniques and communication protocols are used to provide two-way voice and data communications in a handheld, telephone-like communication handset. The different modulation and transmission schemes each have advantages and disadvantages.

In a 3G application for a system operating in the wideband code division multiple access (WCDMA) communication system, a portable transceiver operates in full-duplex mode. That is, both a receiver and a transmitter are operating simultaneously. In this operational mode, energy from the transmitted signal generated in the handset "leaks" into the receiver channel and generates a second-order inter-modulation signal component, which unfortunately falls in the same range of frequencies as the received signal.

Conventional approaches to reduce the transmitter signal leakage into the receive channel include the introduction of one or more surface-acoustic wave (SAW) filters. The transduction from electric energy to mechanical energy (in the form of SAWs) is accomplished by the use of piezoelectric materials. Electronic devices employing a SAW normally utilize one or more interdigital transducers (IDTs) to convert an acoustic wave to an electrical signal and vice versa using the piezoelectric effect of certain materials (e.g., quartz, lithium niobate, lithium tantalate, lanthanum gallium silicate, etc.). These devices are fabricated utilizing photolithography, the process used in the manufacture of silicon integrated circuits.

SAW filters have been successfully applied in many cellular telephone architectures and provide significant advantages in performance, cost, and size over other filter technologies (e.g., digital signal processors, quartz crystals (bulk wave), LC filters, and waveguide filters). The continued drive in the industry toward reducing cost and device size, as well as the desire to realize increased efficiencies, makes it desirable to remove SAW filters from the telephone. However, removal of a SAW filter before a duplexer that couples both a receive channel and a transmit channel to a common antenna reintroduces the above-described interference in a desired receive signal due to second order inter-modulation signal components from the transmit signal.

FIG. 1 is a schematic diagram illustrating the introduction of transmitter generated second order inter-modulation (IM2) in a desired receive signal of a conventional full duplex transceiver. The transceiver includes a transmit channel upconverter or TX upconverter 10, power amplifier 20, duplexer 30, and antenna 40 in a transmit channel. The transceiver also includes the antenna 40, duplexer 30, a low-noise amplifier 50 and a receive channel downconverter or RX downconverter 60 in a receive channel. A TX baseband signal containing information to be transmitted by the transceiver is upconverted from a baseband frequency to a RF frequency by the TX upconverter 10 before being amplified by the power amplifier 20. The frequency modified TX baseband signal is a RF transmit signal. The RF transmit signal, labeled TX signal and illustrated with arrows pointing toward the antenna 40, is amplified by the power amplifier 20 and coupled to the antenna 40 via the duplexer 30. A remotely generated receive signal, labeled RX signal and illustrated with arrows pointing to the right side of the figure, is received by the antenna 40 and coupled via the duplexer 30 to the low-noise amplifier 50. The low-noise amplifier 50 amplifies the RX signal and forwards the amplified RX signal to the RX down converter 60 and other components in the handset for further baseband processing. When the portable transceiver operates in a full duplex mode, the duplexer 30 is simultaneously processing the RF transmit signal and the RF receive signal. The duplexer 30 is an imperfect device and provides limited isolation in the absence of a RX bandpass filter (e.g., a SAW filter), hence some portion of the transmit signal energy, labeled TX leakage, is coupled into the receive path of the transceiver.

The plot in FIG. 1 shows the relative amplitude and frequency relationships of the desired RX signal and the TX leakage signal present after RX down conversion. Even though the TX leakage signal is shifted in frequency from the desired RX signal, a TX IM2 signal is present in the same range of frequencies as the RX signal. The TX IM2 signal results from a second order non-linearity in the receive path of the transceiver.

Therefore, it would be desirable to develop a transceiver architecture absent SAW filters that is not adversely affected by the above described inter-modulation interference.

SUMMARY

An embodiment of a transmit leakage signal canceller and method for cancelling second-order inter-modulation due to a transmit leakage signal in a receive channel in a mobile handset includes a delay estimator and a digital signal adjuster. The delay estimator generates an estimate of the delay between a transmit reference signal and the second-order inter-modulation due to the transmit leakage signal in a receive channel. The digital signal adjuster removes the estimate of the transmit leakage second-order inter-modulation from a received signal before forwarding a modified signal to a baseband subsystem of the portable handset.

An embodiment of method for cancelling second-order inter-modulation due to a transmit leakage signal in a mobile handset includes the steps of inserting a canceller between a RF subsystem and a baseband subsystem of the mobile handset, using the canceller to generate an estimate of the second-order inter-modulation expected in a receive channel due to leakage of a transmit signal into the receive channel and combining a signal from the receive channel with the estimate of second-order inter-modulation due to the transmit leakage signal.

The figures and detailed description that follow are not exhaustive. The disclosed embodiments are illustrated and described to enable one of ordinary skill to make and use the transmit leakage signal canceller and method for reducing second-order inter-modulation due to a transmit leakage signal in a receive channel of a mobile handset. Other embodiments, features and advantages of the canceller and method will be or will become apparent to those skilled in the art upon examination of the following figures and detailed description. All such additional embodiments, features and advantages are within the scope of the disclosed systems and methods as defined in the accompanying claims.

BRIEF DESCRIPTION OF THE FIGURES

The transmit signal IM2 canceller and methods for cancelling IM2 in a mobile handset can be better understood with reference to the following figures. The components within the figures are not necessarily to scale, emphasis instead being placed upon clearly illustrating the principles and operation of the canceller and the methods. Moreover, in the figures, like reference numerals designate corresponding parts throughout the different views.

DETAILED DESCRIPTION

Figure 1:
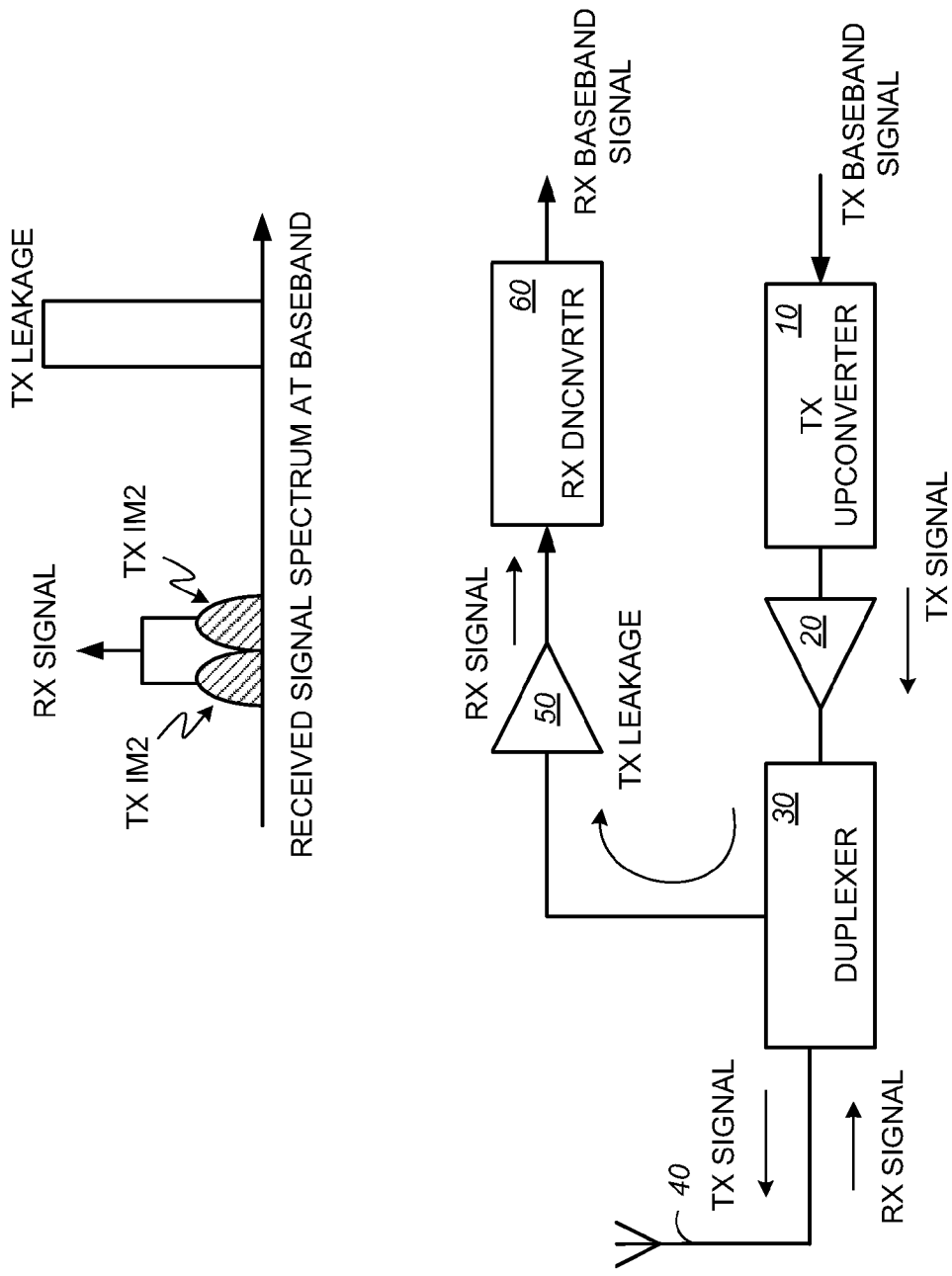
FIG. 1 is a schematic diagram illustrating the introduction of a transmitter leakage signal that generates IM2 on the desired receive signal of a conventional full duplex transceiver.

Although described with particular reference to a portable transceiver operating under the wideband code division multiple access (WCDMA) modulation scheme, the canceller and method for reducing second order inter-modulation in a mobile handset can be implemented in any communication device where full duplex operation of a transceiver is desired. That is, the canceller and method for reducing second order inter-modulation can be integrated with any full duplex communication system in which leakage from a transmitter into a receiver results in interference in a receive frequency band of interest.

The IM2 canceller and methods for cancelling or reducing IM2 in a mobile handset can be implemented in hardware, software, or a combination of hardware and software. When implemented in hardware, the IM2 canceller and methods can be implemented using specialized hardware elements and logic. When the IM2 canceller and methods are implemented partially in software, the software portion can be used to control one or more components in the mobile handset so that various operating aspects can be software-controlled. The software can be stored in a memory and executed by a suitable instruction execution system (microprocessor). The hardware implementation of the IM2 canceller and methods for cancelling or reducing IM2 in a mobile handset can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for the IM2 canceller and methods for cancelling or reducing IM2 in a mobile handset comprise an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 2:
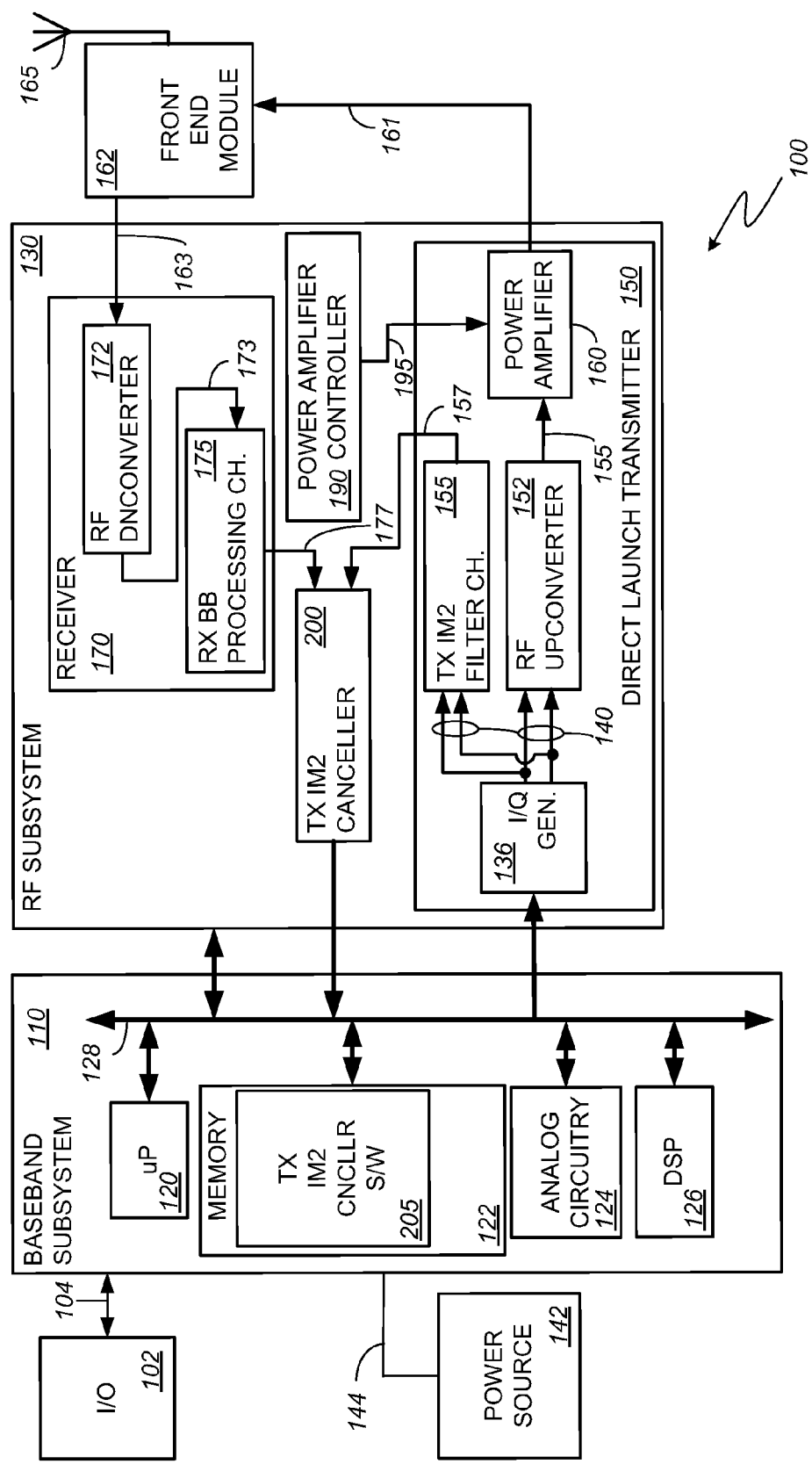
FIG. 2 is a block diagram illustrating a simplified portable transceiver including a transmit signal IM2 canceller.

FIG. 2 is a block diagram illustrating a simplified portable transceiver 100 including a TX IM2 canceller 200. The portable transceiver 100 includes an input/output (I/O) element 102 coupled to a baseband subsystem 110 via connection 104. The I/O element 102 represents any interface with which a user may interact with the portable communication device 100. For example, the I/O element 102 may include a speaker, a display, a keyboard, a microphone, a trackball, a thumbwheel, or any other user-interface element. A power source 142, which may be a direct current (DC) battery or other power source, is also connected to the baseband subsystem 110 via connection 144 to provide power to the portable transceiver 100. In a particular embodiment, portable transceiver 100 can be, for example but not limited to, a portable telecommunication device such as a mobile cellular-type telephone.

The baseband subsystem 110 includes microprocessor (µP) 120, memory 122, analog circuitry 124, and digital signal processor (DSP) 126 in communication via bus 128. Bus 128, although shown as a single bus, may be implemented using multiple busses connected as necessary among the subsystems within baseband subsystem 110.

Depending on the manner in which the TX IM2 canceller 200 and methods for cancelling IM2 are implemented, the baseband subsystem 110 may also include one or more of an application specific integrated circuit (ASIC), a field programmable gate array (FPGA), or any other implementation-specific or general processor. In an alternative embodiment (not shown), one or more of an ASIC, a FPGA or other implementation-specific or general processor may be integrated in the RF subsystem 130 to control the TX IM2 canceller 200 and related elements for cancelling IM2 in the portable transceiver 100.

Microprocessor 120 and memory 122 provide the signal timing, processing and storage functions for portable transceiver 100. Analog circuitry 124 provides the analog processing functions for the signals within baseband subsystem 110. The baseband subsystem 110 provides data and control signals to a radio frequency (RF) subsystem 130. The RF subsystem 130 receives data from remote transmitters and forwards the received data to the baseband system 110 for further processing. The RF subsystem 130 includes a direct launch transmitter 150, a receiver 170, a power amplifier controller 190, and the TX IM2 canceller 200. The elements within the RF subsystem 130 can be controlled by signals from the baseband subsystem 110, which is connected to various baseband elements via bus 128. The elements within the RF subsystem 130 can be implemented via application specific integrated circuits. Alternatively, the direct launch transmitter 150, receiver 170, power amplifier controller 190 and the TX IM2 canceller 200 may be located on a single RF integrated circuit (IC).

The baseband subsystem 110 generates various control signals, such as a power control signal, that are used to control the power amplifier controller 190 and the power amplifier 160, as known to those skilled in the art. The control signals on connection 128 may originate from the DSP 126, the microprocessor 120, or from any other processor within the baseband subsystem 110, and are supplied to a variety of connections within the direct launch transmitter 150, receiver 170 and power amplifier controller 190. Additional control signals on connection 128 originating from the DSP 126, the microprocessor 120, or from any other processor within the baseband subsystem 110 are supplied to the TX IM2 filter chain 155, the RX baseband processing chain 175 and the TX IM2 canceller 200. It should be noted that, for simplicity, only the basic components of the portable transceiver 100 are illustrated herein. The control signals provided by the baseband subsystem 110 control the various components within the portable transceiver 100. Further, the functions within the direct launch transmitter 150 and the receiver 170 may be integrated into a transceiver.

The power amplifier controller 190 generates a power amplifier (PA) power control signal. The power control signal is coupled to the power amplifier 160 via connection 195. The power control signal controls the power output of the power amplifier 160 based on various inputs. For example, in an embodiment, a closed power control loop may influence the power output of the power amplifier 160. In another embodiment, an open power control loop may influence the power output of the power amplifier 160. For example, in an embodiment, a signal received by a base station with which the portable transceiver 100 is communicating may issue a power control signal. In other embodiments, the baseband subsystem 110 provides enable, standby and power control signals to the power amplifier controller 190. In turn, the power amplifier controller 190 processes the enable, standby and power control signals and generates a power control signal that is communicated to the power amplifier 160 on connection 195.

If portions of the TX IM2 canceller 200 and the methods for cancelling IM2 in a mobile handset such as the portable transceiver 100 are implemented in software that is executed by the microprocessor 120, the memory 122 will include IM2 canceller software 205. The TX IM2 canceller software 205 comprises one or more executable code segments that can be stored in the memory 122 and executed in the microprocessor 120. Alternatively, the functionality of the TX IM2 canceller software 205 can be coded into an ASIC (not shown) or can be executed by an FPGA (not shown), or another device or may be integrated into the RF subsystem 130 of the portable transceiver 100. Because the memory 122 can be rewritable and because a FPGA is reprogrammable, updates to the TX IM2 canceller software 205 can be remotely sent to and saved in the portable transceiver 100 when implemented using either of these methodologies.

The simplified portable transceiver 100 includes an embodiment of a direct launch transmitter 150, which includes an I/Q generator 136, a RF upconverter 152, a TX IM2 filter chain 155, and a power amplifier 160. The I/Q generator 136 converts digital information (i.e., the Cartesian in-phase (I) and quadrature (Q) data signal components or the digital data bit stream) within baseband subsystem 110 into a signal suitable for further processing by the RF upconverter 152. The RF upconverter 152 performs a digital to analog conversion and provides analog filtering before upconverting and forwarding the information to the power amplifier 160 for amplification. The I/Q generator 136 and RF upconverter 152 generate a RF transmit signal. The TX IM2 filter chain 155, receives the digital I/Q data from the I/Q generator 136 via connection 140, generates a digital transmit IM2 signal and forwards a filtered version of the digitally generated transmit IM2 signal to the TX IM2 canceller 200 via connection 157. The TX IM2 canceller 200 receives a receive signal from the receiver 170 via connection 177 that has been filtered by the RX baseband processing chain 175.

The TX IM2 filter chain 155 is a simplified version of the receive channel filter processing performed in RX baseband processing chain 175. The TX IM2 canceller 200 generates an estimate of the transmit IM2 in the receive channel introduced by the transmit signal and adaptively filters the estimate before combining the estimate with the receive signal to reduce or effectively cancel the transmit IM2 from the desired receive signal. In the illustrated embodiment, the TX IM2 canceller 200 forwards a composite receive signal that includes the I data and Q data components to the baseband subsystem 110. In alternative embodiments, the composite receive signal may be forwarded to elements within receiver 170 to separate the I data and Q data components prior to communicating the same to the baseband subsystem 110.

The RF upconverter 152 of the direct launch transmitter 150 combines and transforms the digital I data and digital Q data signals to an analog signal. In addition, the RF upconverter 152 upconverts the analog signal from a baseband frequency to an appropriate transmit frequency and provides the upconverted analog signal at the transmit frequency to the power amplifier 160 via connection 155. The power amplifier 160 amplifies the transmit signal to an appropriate power level for the system given present conditions under which the portable transceiver 100 is operating.

The I and Q components may take different forms and be formatted differently depending upon the communication standard being employed. For example, when the power amplifier 160 is used in a constant-amplitude, phase (or frequency) modulation application such as the global system for mobile communications (GSM), the phase modulated information is provided by a modulator within the direct launch transmitter 150. When the power amplifier 160 is used in an application requiring both phase and amplitude modulation such as, for example, extended data rates for GSM evolution, referred to as EDGE or WCDMA, the Cartesian in-phase (I) and quadrature (Q) components contain both amplitude and phase information.

The power amplifier 160 supplies the amplified signal via connection 161 to a front end module 162. The front end module 162 comprises an antenna system interface that may include, for example, a duplexer having a filter pair that allows simultaneous passage of both transmit signals and receive signals, as known to those having ordinary skill in the art. The transmit signal is supplied from the front end module 162 to the antenna 165.

A signal received by an antenna 165 is directed from the front end module 162 to the receiver 170. The receiver 170 includes various components to downconvert, filter, demodulate and recover a data signal from a received signal, as known to those skilled in the art. If implemented using a direct conversion receiver (DCR), the receiver 170 converts the received signal from an RF level to a baseband level (DC), or a near-baseband level (~100 kHz). Alternatively, the received RF signal may be downconverted to an intermediate frequency (IF) signal, depending on the system architecture. In the illustrated embodiment, the receiver includes RF downconverter 172 and RX baseband processing chain 175. The RF downconverter 172 receives the RF signal on connection 163 from the front end module 162. The downconverted receive signal is forwarded on connection 173 to the RX baseband processing chain 175. The RX baseband processing chain 175 processes the downconverted receive signal and provides a filtered receive signal suitable for further processing by the TX IM2 canceller 200 before being forwarded to the baseband subsystem 110. When the TX IM2 canceller 200 is active, the recovered receive signal information with IM2 cancelled from the recovered receive signal is supplied via bus 128 for further processing in the baseband subsystem 110.

Figure 3:
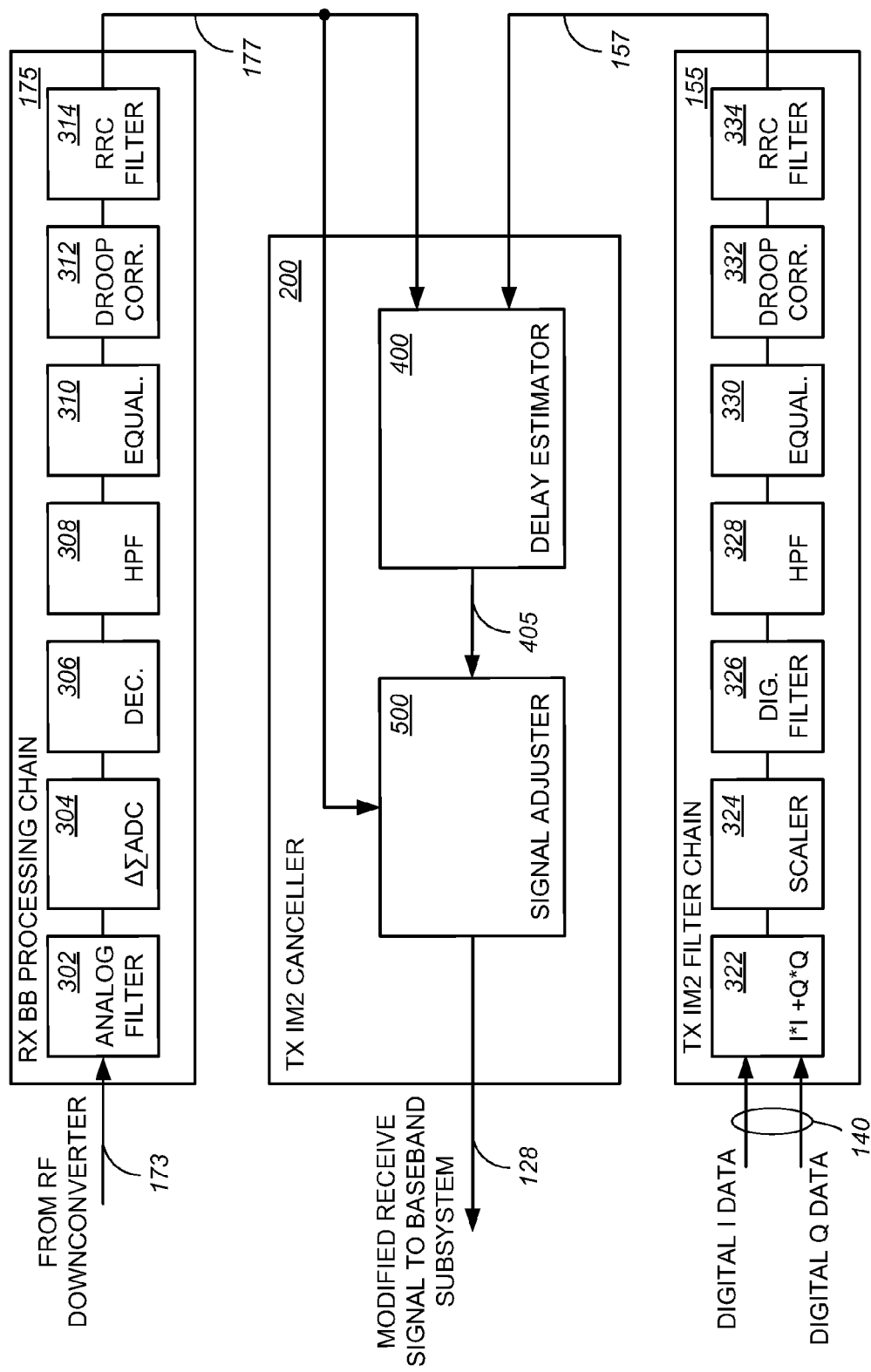
FIG. 3 is a schematic diagram illustrating an example embodiment of the transmit signal IM2 canceller of FIG. 1.

FIG. 3 is a schematic diagram illustrating an example embodiment of each of the RX baseband processing chain 175, the TX IM2 canceller 200 and the TX IM2 filter chain 155 of FIG. 1. The RX baseband processing chain 175 receives a downconverted representation of the receive signal from the RF downconverter 172 via connection 173 and generates a filtered digital representation of the receive signal. As explained, the receive signal provided by the RX baseband processing chain 175 on connection 177 includes transmit channel induced IM2 due to leakage of the transmitted signal into the receiver 170 (FIG. 2).

The RX baseband processing chain 175 includes an analog filter 302, delta-sigma analog-to-digital converter (ADC) 304, decimator 306, high-pass filter 308, equalizer element 310, droop correction element 312 and a root-raised cosine (RRC) filter 314. The analog filter 302 receives the downconverted receive signal and filters the same before forwarding the filtered receive signal to the delta-sigma analog-to-digital converter 304. The delta-sigma ADC 304 samples the filtered receive signal and forwards a digital representation of the filtered receive signal to the decimator 306. The decimator 306 eliminates a select number of the digital samples provided to the decimator 306 by the delta-sigma ADC 304. Thereafter, the high-pass filter 308 removes DC and very low frequency information in the decimated samples and forwards the high-pass filtered receive data to the equalizer 310, which alters the relative signal strengths of different frequencies in the filtered receive signal before forwarding the equalized and filtered receive signal to the droop correction element 312. The droop correction element 312 further equalizes or adjusts the relative signal strengths of different frequencies in the filtered receive signal before forwarding the droop corrected receive signal to the RRC filter 314. The RRC filter 314 is a pulse-shaping filter. The RRC filter 314 is configured to eliminate interchannel interference in a symbol stream. The RRC filter 314 has an impulse response that is zero at nT (where n is an integer and T is the sample period, except where n=0. As indicated in FIG. 3, the RRC filtered symbol stream representing the receive signal is forwarded via connection 177 to the TX IM 2 canceller 200.

The TX IM2 filter chain 155 includes an I*I+Q*Q combiner or combiner 322, scaler element 324, digital filter 326, high-pass filter 328, equalizer element 330, droop correction element 332 and RRC filter 334. The combiner 322 generates a digital symbol based on the real and imaginary components of each of the I data signal and the Q data signal received via connection 140. The scaler 324 receives the digital symbols from the combiner 322 and adjusts the symbols before forwarding the symbols to the digital filter 326. The digital filter 326 samples and adjusts the scaled symbols before forwarding the same to the high-pass filter 328. Thereafter, the high-pass filter 328 removes DC and very low frequency information in the samples and forwards the high-pass filtered transmit data to the equalizer 330, which alters the relative signal strengths of different frequencies in the filtered transmit signal before forwarding the equalized and filtered transmit signal to the droop correction element 332. The droop correction element 332 further equalizes or adjusts the relative signal strengths of different frequencies in the filtered transmit signal before forwarding the droop corrected transmit signal to the RRC filter 334. The RRC filter 334, which is similar to the RRC filter 314 in the RX baseband processing chain 175, reshapes the TX IM2 signal and eliminates interchannel interference in the transmit symbol stream. The RRC filtered symbol stream representing an estimate of IM2 due to the transmit signal in the receive channel is forwarded via connection 157 to the TX IM 2 canceller 200.

The TX IM2 canceller 200 includes a delay estimator 400 and a signal adjuster 500. The delay estimator 400 receives the processed stream of digital symbols from the RX baseband processing chain 175 on connection 177 and the stream of digital symbols representing the estimate of the TX IM2 as generated by the TX IM2 filter chain 155 on connection 157. The processed stream of digital symbols from the RX baseband processing chain 175 includes both the desired data signal and the transmitter induced TX IM2. The TX IM2 canceller aligns the received symbol streams in a delay estimator 400. The delay estimator 400 selects an appropriate transmit data symbol from the stream of processed symbols provided on connection 157 and forwards the select symbol to the signal adjuster 500 on connection 405. In turn, the signal adjuster 500 removes the estimated TX IM2 from the desired data signal and forwards a modified receive signal to the baseband subsystem 100 via bus 128.

Figure 4:
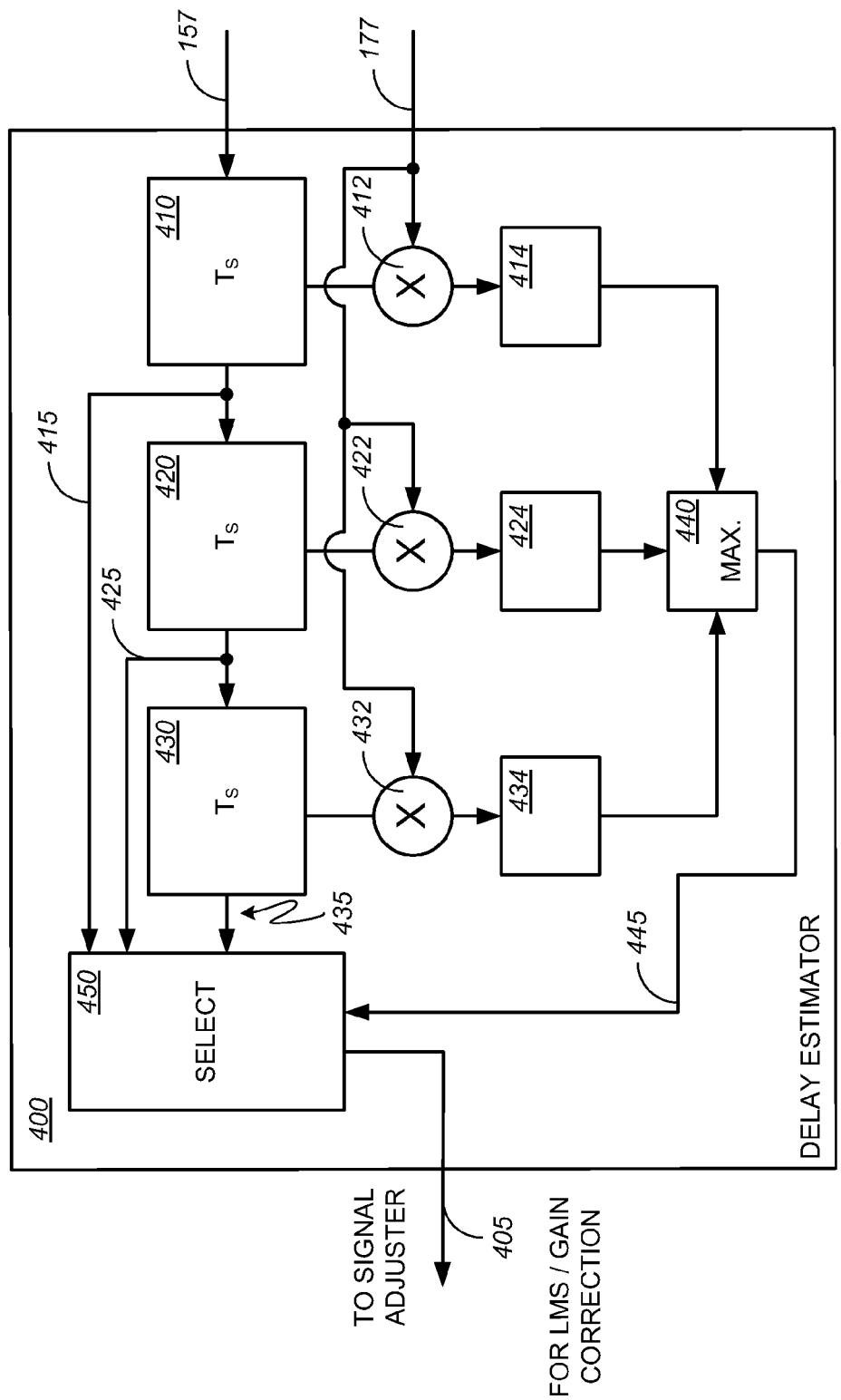
FIG. 4 is a schematic diagram of an embodiment of the delay estimator of FIG. 3.

FIG. 4 is a schematic diagram of an embodiment of the delay estimator 400 of FIG. 3. The delay estimator 400 is a three-tap filter. A first tap includes a delay element 410, a multiplier 412 and an accumulator 414. The delay element 410 receives the estimated TX IM2 symbols via connection 157 and forwards the same after delay Ts via connection 415 to a second tap and to the select element 450. The multiplier 412 combines the estimated TX IM2 symbol with the receive data symbol on connection 177. The multiplier 412 forwards a combined first tap signal to the accumulator 414, which determines a peak magnitude of the combined first tap signal. The peak magnitude of the first tap signal is forwarded to maximum detector (MAX.) 440.

A second tap includes a delay element 420, a multiplier 422, and an accumulator 424. The delay element 420 receives the estimated TX IM2 symbols via connection 415 and forwards the same after delay Ts via connection 425 to a third tap and to the select element 450. The multiplier 422 combines the estimated TX IM2 symbol with the receive data symbol on connection 177. The multiplier 422 forwards a combined second tap signal to the accumulator 424, which determines a peak magnitude of the combined second tap signal. The peak magnitude of the second tap signal is forwarded to maximum detector 440.

A third tap includes a delay element 430, a multiplier 432, and an accumulator 434. The delay element 430 receives the estimated TX IM2 symbols via connection 425 and forwards the same after delay Ts via connection 435 to the select element 450. The multiplier 432 combines the estimated TX IM2 symbol with the receive data symbol on connection 177. The multiplier 432 forwards a delayed output at the third tap signal to the accumulator 434, which determines a peak magnitude of the combined third tap signal. The peak magnitude of the third tap signal is forwarded to maximum detector 440. The maximum detector 440 determines which of the three detected peak magnitudes is the greatest and forwards a signal via connection 445 to the select element 450 identifying the same. In turn, the select element 450 forwards the identified one of the estimated TX IM2 symbols from one of the first tap, the second tap or the third tap on connection 405 gain correction in the signal adjuster 500. The delay between the TX IM2 filter chain 155 and the RX baseband processing chain 175 is fixed for a certain design and the delay estimator 400 could be used once during a factory calibration or during a power up sequence to find an optimum delay path among connection 415, connection 425, and connection 435.

Figure 5:
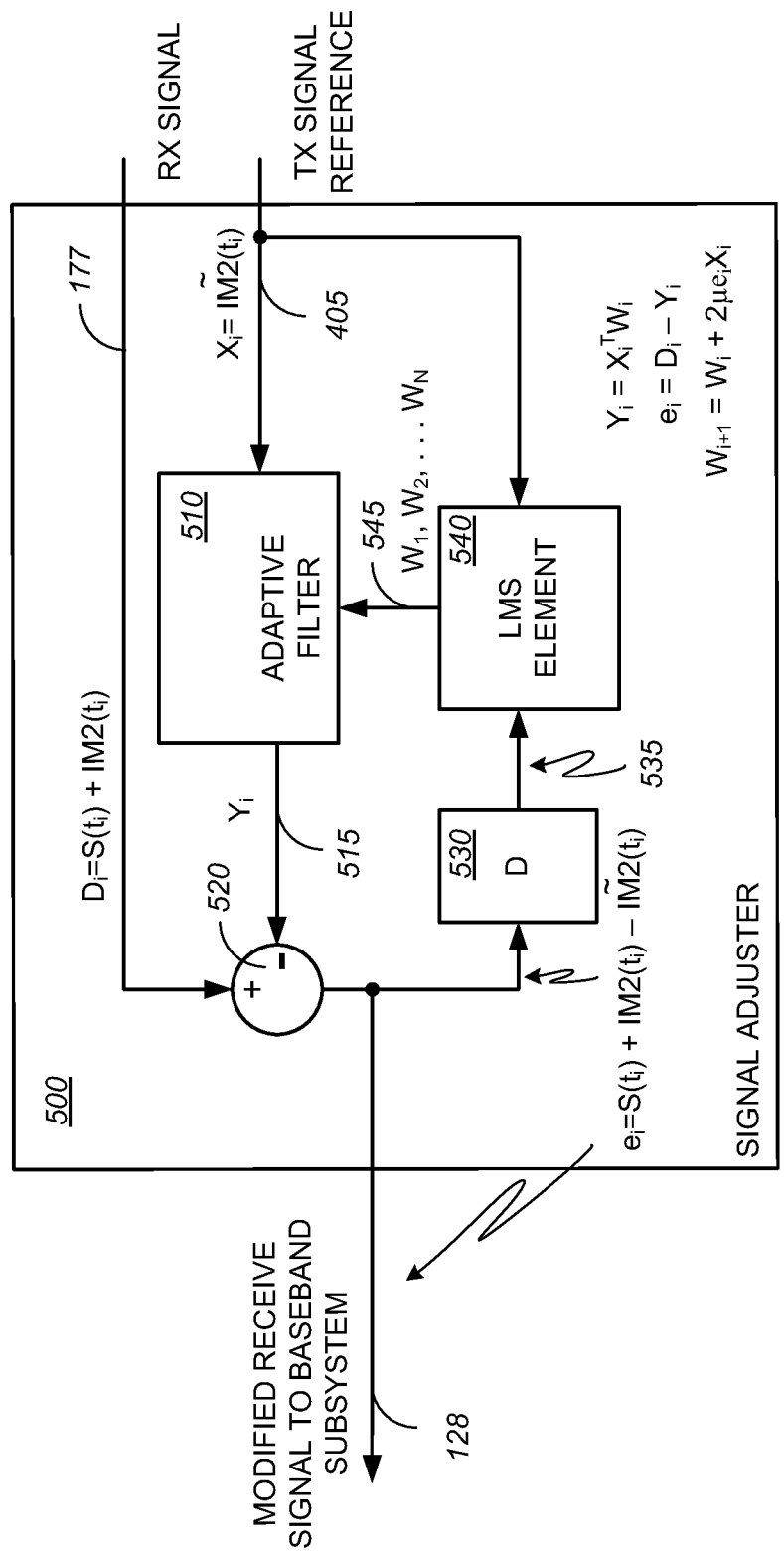
FIG. 5 is a schematic diagram of an embodiment of the signal adjuster of FIG. 3.

FIG. 5 is a schematic diagram of an embodiment of the signal adjuster 500 of FIG. 3. The signal adjuster 500 receives the processed receive signal on connection 177 and the estimate of the TX IM2 present in the processed receive signal on connection 405. The estimate of the TX IM2 is labeled "TX SIGNAL REFERENCE" in FIG. 5. The signal adjuster 500 includes an adaptive filter 510, a combiner 520, a delay element 530 and a least mean square element 540. The adaptive filter 510 receives the estimate of TX IM2 on connection 405 and provides a filtered version of the estimate, $Y_i$, on connection 515. The combiner 520 receives the processed receive signal on connection 177 and applies the same at a positive or additive input. The combiner 520 receives the adaptively filtered version of the estimate of TX IM2 at a negative or subtractive input. The result of the mathematical combination of the two signals is a representation of the desired receive data symbol. The desired receive data symbol, $e_i$, is forwarded via bus 128 to both the baseband subsystem 110 and via a feedback path to the LMS element 540. The feedback path includes the delay element 530 and the least mean square element 540. The least mean square element 540 receives the TX signal or reference signal on connection 405. The combination of the delay element 530 and the least mean square element 540 generates a filter coefficient, $W_i$, which sets the characteristics of the adaptive filter 510 that is applied to the estimate of the TX IM2 received on connection 405.

As indicated in FIG. 5, the processed RX signal on connection 177 is represented by the following relationship:

$$D_i = S(t_i) + IM2(t_i) \qquad \text{Eq. 1}$$

The estimate of the TX IM2 present in the receive signal is represented by the relationship in equation 2 below.

$$X_i = I\tilde{M}2(t_i) \qquad \text{Eq. 2}$$

The output of the adaptive filter is represented by the relationship in equation 3 below.

$$Y_i = X_i^T W_i \qquad \text{Eq. 3}$$

where, $e_i = D_i - Y_i$ and $W_{i+1} = W_i + 2\mu e_i X_i$.

The filter coefficients, $W_i$, are adjusted to minimize the difference between the TX IM2 component carried in the RX signal on connection 177 and the reference TX IM2 signal on connection 405 from the delay estimator 400. The relationship that defines how the coefficients are updated includes a factor, $\mu$ that defines the rate of update. The rate of update of the coefficients controls the convergence and stability of the signal adjuster 500. The combination of the RX baseband processing chain 175, the TX IM2 filter chain 155 and the TX IM2 canceller 200 reduces the TX IM2 to an acceptable level in the received signal. That is, the TX IM2 canceller 200 minimizes the amount of IM2 in the RX signal on connection 177 that results from transmitter leakage in the front end module 162.

Figure 6:
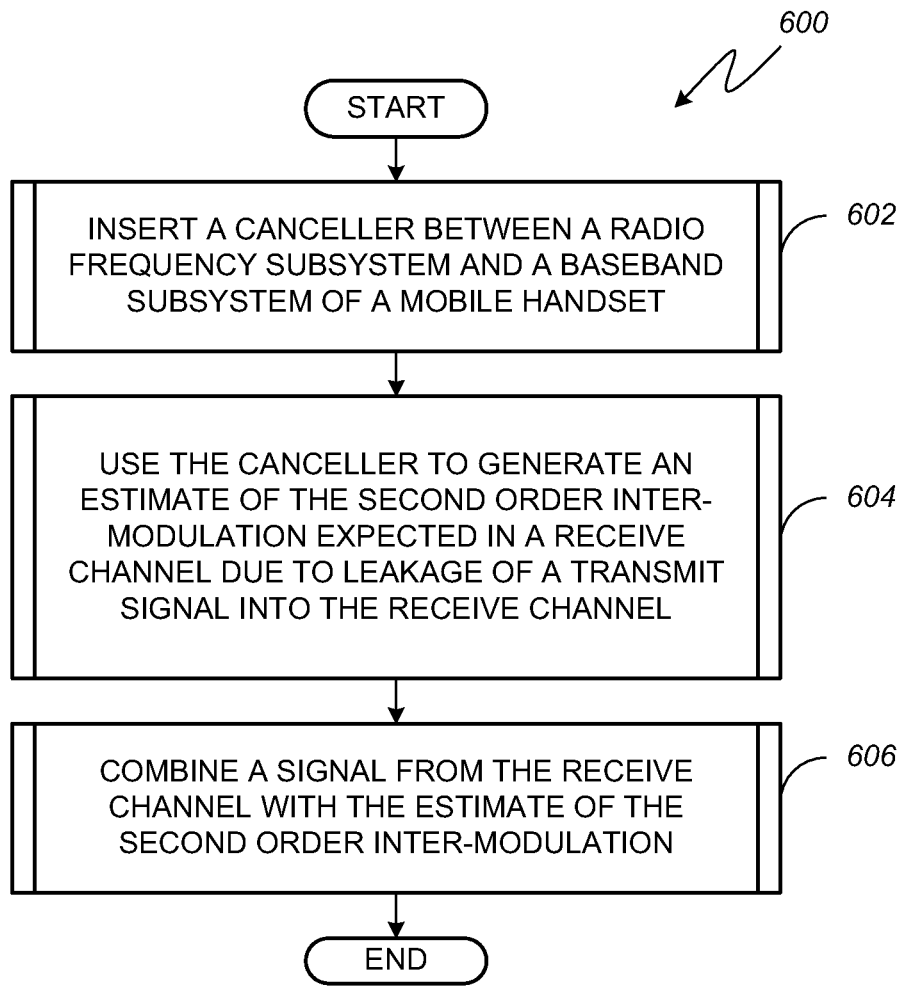
FIG. 6 is a flow chart illustrating an embodiment of a method for reducing second order inter-modulation in a mobile handset.
Figure 7:
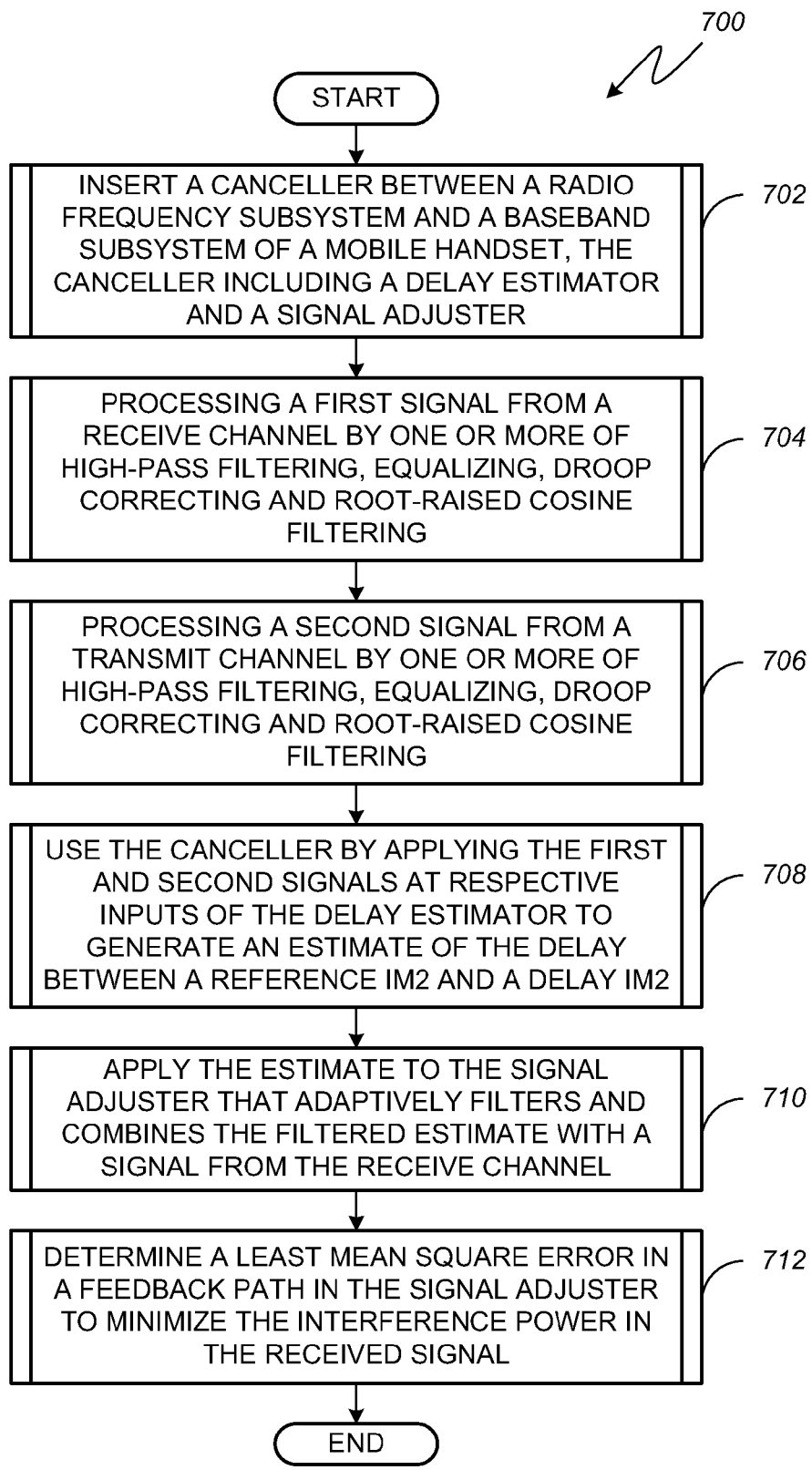
FIG. 7 is a flow chart illustrating an alternative embodiment of a method for reducing second order inter-modulation in a mobile handset.

The flow diagrams of FIGS. 6 and 7 show the architecture, functionality, and operation of possible implementations via software and or firmware associated with an IM2 canceller arranged with similar transmit and receive channel filter chains in a mobile handset. In this regard, a block can represent a module, segment, or portion of code, which comprises one or more executable instructions for implementing the specified function(s). When the IM2 canceller is implemented via hardware, hardware and firmware or a combination of hardware and software, one or more blocks in the flow diagram may represent a circuit or circuits. Alternatively, the described functions can be embodied in source code including human-readable statements written in a programming language or machine code that comprises instructions recognizable by a suitable execution system such as a processor in a computer system. The machine code may be converted from the source code, etc.

FIG. 6 is a flow chart illustrating an embodiment of a method for reducing second order inter-modulation in a mobile handset. The method 600 begins with block 602 where a canceller is inserted between a radio frequency subsystem and a baseband subsystem of a mobile handset. Thereafter, as indicated in block 604, the canceller generates an estimate of the second order inter-modulation expected in a receive channel of the mobile handset due to leakage of a transmit signal into the receive channel. As shown in block 606, a signal from the receive channel is combined with the estimate of the second order inter-modulation to reduce the second order inter-modulation in the receive signal.

FIG. 7 is a flow chart illustrating an alternative embodiment of a method for cancelling or reducing IM2 in a mobile handset. The method 700 begins with block 702 where a canceller is inserted between a radio frequency subsystem and a baseband subsystem of a mobile handset. As further indicated in block 702, the canceller includes a delay estimator and a signal adjuster. In block 704, a first signal in a receive channel is processed by one or more of high-pass filtering, equalizing, droop correcting and root-raised cosine filtering. In block 706, a second signal from a transmit channel is similarly processed by one or more of high-pass filtering, equalizing, droop correcting and root-raised cosine filtering. Thereafter, as indicated in block 708, the canceller applies the first and second signals at respective inputs of the delay estimator to generate an estimate of the delay between a reference IM2 (i.e., the second signal from the transmit channel) and IM2 in the desired signal (i.e., the first signal from the receive channel) Next, as indicated in block 710, the estimate is applied at an input of the signal adjuster. The signal adjuster adaptively filters and combines the filtered estimate with a signal from the receive channel. As shown in FIG. 5, the combination is a subtraction of the estimated IM2 in the receive channel due to transmit signal leakage into the receive channel. In block 712, the signal adjuster determines a least mean square error in a feedback path to minimize the interference power in the received signal.

While various embodiments of the IM2 canceller, delay estimator, signal adjuster and methods for cancelling IM2 in a mobile handset have been described, it will be apparent to those of ordinary skill in the art that many more embodiments and implementations are possible that are within the scope of this disclosure. Accordingly, IM2 canceller, delay estimator, signal adjuster and methods for cancelling IM2 are not to be restricted except in light of the attached claims and their equivalents.

What is claimed is:

1. A portable handset, comprising:
an antenna;
a front-end module coupled to the antenna, leakage associated with a transmit signal coupling with a receive signal within the front-end module to introduce second-order intermodulation (IM2) into the receive signal; and
a digital transmit-signal (IM2) canceller that operates in a full-duplex mode, the digital transmit-signal IM2 canceller including a delay estimator configured to receive the receive signal and an estimate of the IM2 introduced in the receive signal, the delay estimator including an N-tap digital filter configured to generate a delayed estimate of the IM2 for each tap, each of the delayed estimates corresponding to respective delay paths having differing amounts of delay, the delay estimator further configured to combine the receive signal with each delayed estimate, determine a peak magnitude of each combined signal, and, during power up or factory calibration of the portable handset, identify the tap associated with a maximum peak magnitude and select the delayed estimate associated with the identified tap for use during operation of the portable handset, the selected delayed estimate and corresponding amount of delay being fixed during operation of the portable handset, the IM2 canceller further including a digital signal adjuster configured to generate a modified signal by combining the receive signal with a filtered output of the identified tap.

2. The portable handset of claim 1 wherein the digital signal adjuster further includes a least mean squares element configured to generate filter coefficients of an adaptive filter by adaptively minimizing a difference between the receive signal and an identified delayed estimate of the second-order inter-modulation.

3. The portable handset of claim 1 wherein N is 3.

4. The portable handset of claim 1 wherein the receive signal and the estimate of the second-order inter-modulation have been processed by respective filter chains.

5. The portable handset of claim 4 wherein the respective filter chains include a series combination of a high-pass filter, an equalizer, a droop correction element, and a root-raised cosine filter.

6. The portable handset of claim 1 wherein the digital signal adjuster includes an adaptive filter, a combiner, and a feedback path to the adaptive filter.

7. The portable handset of claim 1 wherein the combining includes subtracting the filtered output of the identified tap from the receive signal.

8. The portable handset of claim 6 wherein the feedback path includes a delay element and a least mean square element.

9. The portable handset of claim 1 wherein coefficients of an adaptive filter are adjusted to minimize a difference between the receive signal from the receive channel and an identified delayed estimate of the second-order inter-modulation.

10. A method to cancel second-order inter-modulation (IM2) in a mobile handset, the method comprising:
with a front-end module of a mobile handset, receiving a receive signal from an antenna of the mobile handset and an estimate of second-order inter-modulation (IM2) expected in the receive signal due to leakage within the front end module of a transmit signal into the receive signal;
generating with an N-tap digital filter a delayed estimate of the second-order inter-modulation for each tap, each of the delayed estimates corresponding to respective delay paths having differing amounts of delay;
separately combining the receive signal with each delayed estimate, and determining a peak magnitude of each combined signal;
identifying, during power up or factory calibration of the mobile handset, the tap associated with a maximum peak magnitude;
selecting the delayed estimate associated with the identified tap for use during operation of the mobile handset, the selected delayed estimate and corresponding amount of delay being fixed during operation of the mobile handset; and
generating a modified signal by combining the receive signal with a filtered output of the identified tap.

11. The method of claim 10 further comprising inserting a canceller between a radio frequency (RF) subsystem and a baseband subsystem of the mobile handset.

12. The method of claim 11 wherein inserting the canceller includes inserting a delay estimator and a signal adjuster.

13. The method of claim 11 further comprising receiving the receive signal at a first input of the canceller from a receive channel and receiving the estimate of the second-order inter-modulation at a second input of the canceller from a transmit channel.

14. The method of claim 10 further comprising processing the receive signal and the estimate of the second-order inter-modulation by respective filter chains.

15. The method of claim 14 wherein processing by respective filter chains includes high-pass filtering, equalizing, droop correcting, and root-raised cosine filtering.

16. The method of claim 10 further comprising forwarding the modified signal to a baseband subsystem of a mobile handset transceiver.

17. The method of claim 10 wherein combining includes subtracting the filtered output of the identified tap from the receive signal.

18. The method of claim 10 further comprising generating filter coefficients of an adaptive filter by adaptively minimizing a difference between the receive signal and an identified delayed estimate of the second-order inter-modulation.

19. The method of claim 18 wherein adaptively minimizing includes delaying and calculating a least mean square error in a feedback path.

20. The method of claim 19 wherein calculating the least mean square error in the feedback path includes adjusting the filter coefficients.

* * * * *